United States Patent [19]
Nunnally

[11] Patent Number: 6,163,417
[45] Date of Patent: *Dec. 19, 2000

[54] PEGS FOR JOINING MODULAR TRANSLATION STAGES AND OTHER OPTICAL TEST BENCH HARDWARE

[75] Inventor: Millard A. Nunnally, Mission Viejo, Calif.

[73] Assignee: Newport Corporation, Irvine, Calif.

[*] Notice: This patent is subject to a terminal disclaimer.

[21] Appl. No.: 09/317,671

[22] Filed: May 24, 1999

[51] Int. Cl.$^7$ ............................................. G02B 7/02
[52] U.S. Cl. ..................... 359/822; 359/811; 359/813; 359/823
[58] Field of Search .................... 359/819, 820, 359/821, 822, 823, 811, 812, 813

[56] References Cited

U.S. PATENT DOCUMENTS

| | | | |
|---|---|---|---|
| 5,194,993 | 3/1993 | Bedzyk | 359/813 |
| 5,757,561 | 5/1998 | Sechrist et al. | 359/822 |
| 5,825,558 | 10/1998 | Farmiga et al. | 359/819 |
| 5,852,519 | 12/1998 | Do et al. | 359/822 |
| 5,880,894 | 3/1999 | Blakley | 359/819 |
| 5,909,324 | 6/1999 | Braynt et al. | 359/822 |
| 5,930,057 | 7/1999 | Sechrist et al. | 359/822 |
| 5,946,023 | 8/1999 | Blanding | 347/257 |
| 6,016,230 | 1/2000 | Nunnally et al. | 359/819 |

Primary Examiner—Georgia Epps
Assistant Examiner—Saeed Seyrafi
Attorney, Agent, or Firm—Irell & Manella LLP

[57] ABSTRACT

A peg system for joining modular optical translation stage assemblies and other optical test bench hardware that can allow an operator to build multiple types of translation stages and other optical test bench hardware configurations. The assemblies may include a peg that can couple a first translation stage to a second translation stage. The assembly may also have a fastener that secures the peg to the second translation stage. A third translation stage can be coupled to the second translation stage. The assembly allows an operator to build either an x-axis stage, an xy-axis stage or an xyz-axis stage. A disk or cylindrical post or post holder or other optical test bench hardware may also be used with the peg system to provide rotational degrees of freedom.

19 Claims, 3 Drawing Sheets

PEGS FOR JOINING MODULAR TRANSLATION STAGES AND OTHER OPTICAL TEST BENCH HARDWARE

BACKGROUND OF THE INVENTION

1. Field of the Invention

The present invention relates to joining modular optical translation stage assemblies and other optical test bench hardware typically used to move an optical element such as a mirror or a lens.

2. Background Information

Optical test benches are typically used to test and develop optical experiments and/or products. An optical test bench may have a number of discrete optical elements mounted to an optical table. The optical elements may include mirrors, lenses, prisms, etc. as is known in the art. One or more of the optical elements may be attached to a translation stage or other optical test bench hardware that can be actuated or moved to adjust the position of the element. There are typically three types of translation stages; an x-axis stage that can move the optical element in one direction, an xy-axis stage that can move the element in two orthogonal directions, and an xyz-axis stage that can move the element in three orthogonal directions. These stages are typically sold as separate products. For example, Newport Corp., the assignee of the present invention, presently sells an x-axis stage, an xy-axis stage and an xyz-axis stage as separate products. If a customer wants to have an x stage and an xy stage, they may purchase two separate products. It would be desirable to provide a modular optical translation stage assembly that allows an operator to easily create an x-axis stage, an xy-axis stage, or an xyz-axis stage without removing other optical hardware from the translation stage assembly.

SUMMARY OF THE INVENTION

One embodiment of the present invention is a modular optical mount assembly that can allow an operator to build multiple types of mounts. The assembly may include a peg that can couple a first mount to a second mount. The assembly may also have a fastener that secures the peg to the second mount.

DETAILED DESCRIPTION

Figure 1:
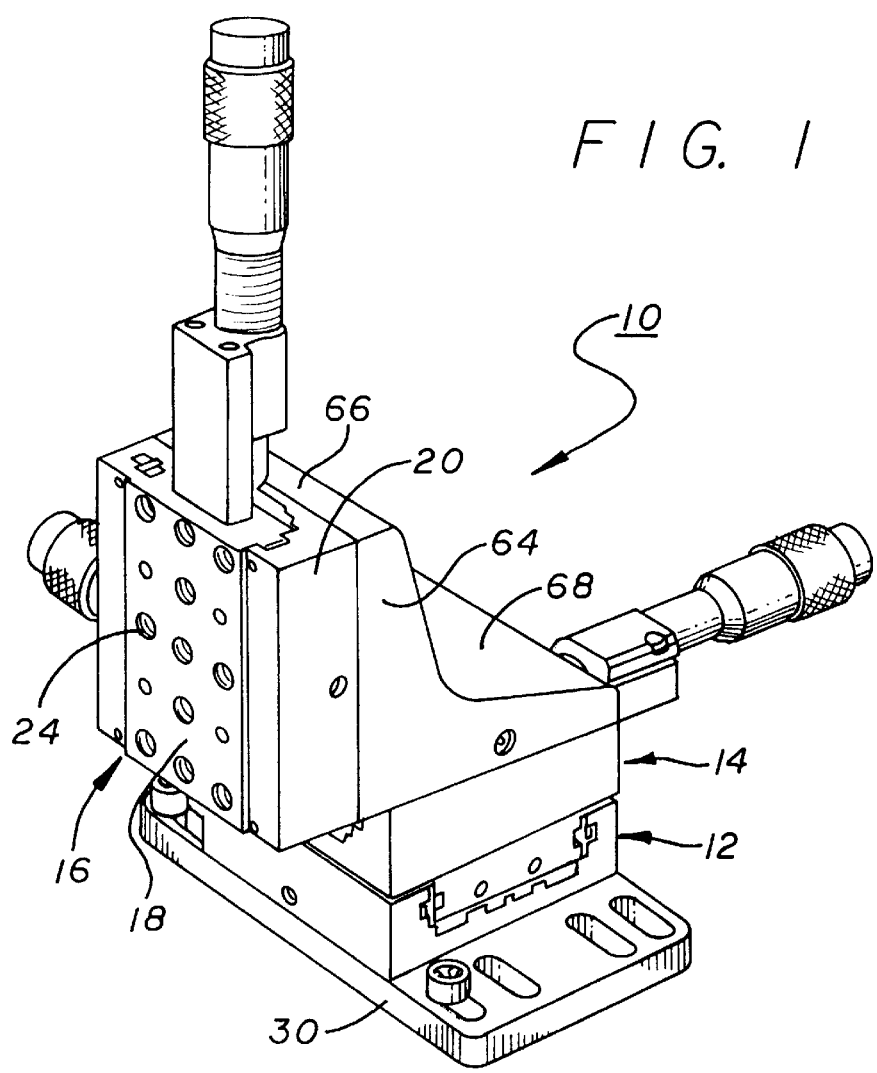
FIG. 1 is a perspective view of an embodiment of a modular optical mount assembly of the present invention with a plurality of translation stages.
Figure 2:
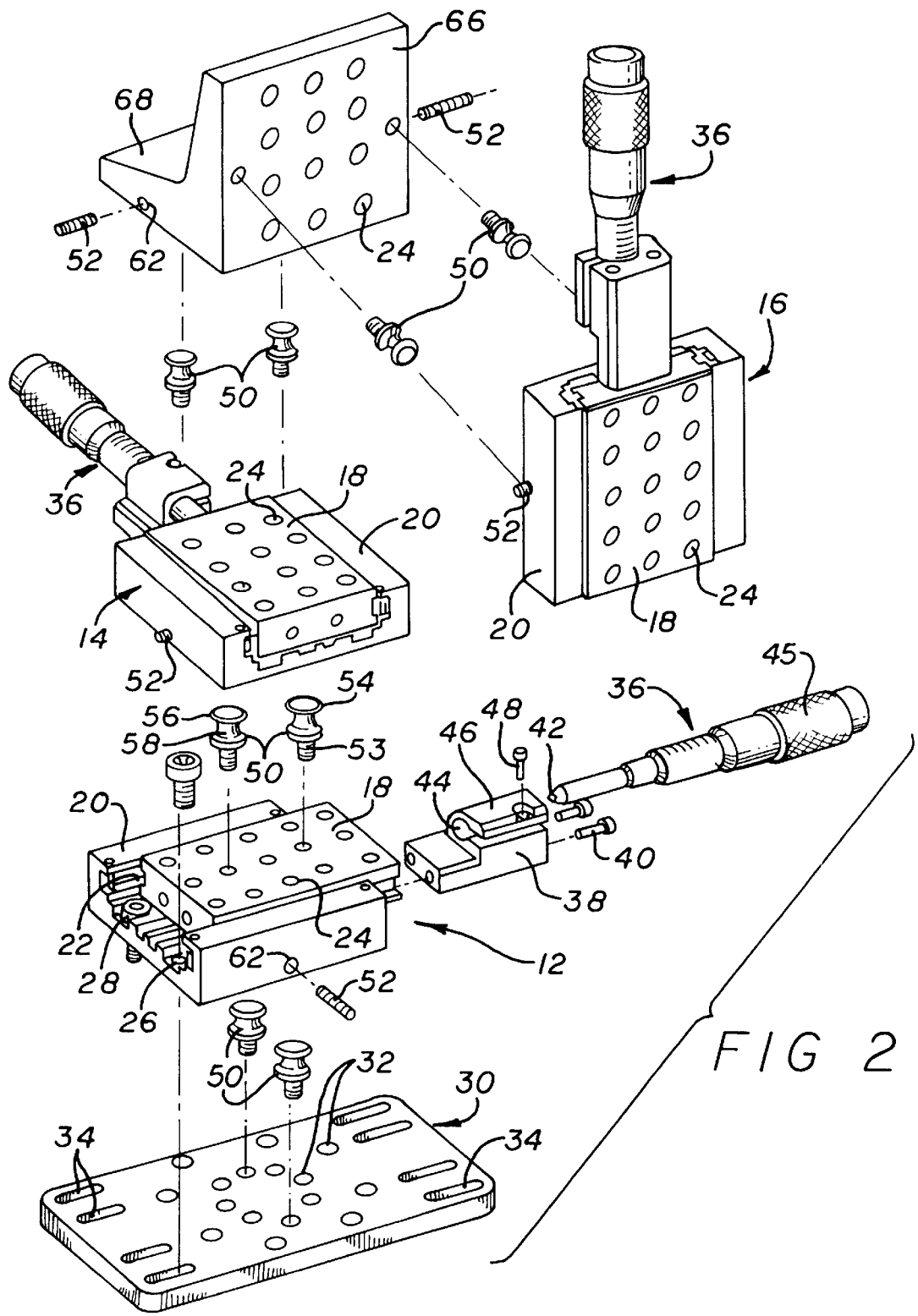
FIG. 2 is an exploded view the modular optical mount assembly.

Referring to the drawings more particularly by reference numbers, FIGS. 1 and 2 shows an embodiment of a modular optical mount assembly 10 of the present invention. The assembly 10 may include a first translation stage 12, a second translation stage 14 and a third translation stage 16. Each translation stage 12, 14 and 16 may essentially be an x-axis translation stage that contains a translation table 18 that can move relative to a translation base 20. The stages 12, 14 and 16 may utilize linear bearings 22 to insure linear movement of the tables 18. Each table 18 may have a plurality of threaded apertures 24. An optical mount (not shown) can be attached to the apertures 24 as is known in the art. Each translation base 20 may have a plurality of clearance holes 26 which allow a fastener 28, such as a bolt, to attach the base 20 to an optical table (not shown) as is known in the art.

The assembly 10 may include an adapter plate 30 that has a plurality of threaded apertures 32 which allow a translation stage 12, 14 or 16 to be attached thereto. The adapter plate 30 may also have a plurality of slotted holes 34 that allow the plate 30 and stages 12, 14 and/or 16 to be mounted to the optical table. The slotted holes 34 allow coarse adjustment of the stages 12, 14 and/or 16 relative to the optical table.

Each stage 12, 14 and 16 may have an actuator 36 that can move the table 18 relative to the base 20. The actuator 36 may be a micrometer that can be adjusted by an operator. The actuator 36 may be coupled to the table 18 by a bracket 38 that is attached to the base 20 by fasteners 40. The actuator 36 may have at tip 42 that extends through a corresponding passage 44 in the bracket 38. Rotation of an actuator handle 45 may induce a corresponding linear movement of the tip 42 and table 18 as is known in the art. The actuator 36 may be secured to the bracket 38 by a fastener 48 that presses a C-clamp 46 integrated into the bracket 38.

The assembly 10 may also have a plurality of pegs 50 and fasteners 52 that can couple together the stages 12, 14 and 16. Each peg 50 may include a threaded portion 53 and a head portion 54. Each head portion 54 may include a pair of collars 56 that are separated by a groove 58. The pegs 50 can be constructed from either a metal or plastic material. The fasteners 52 may be set screws.

Figure 3:
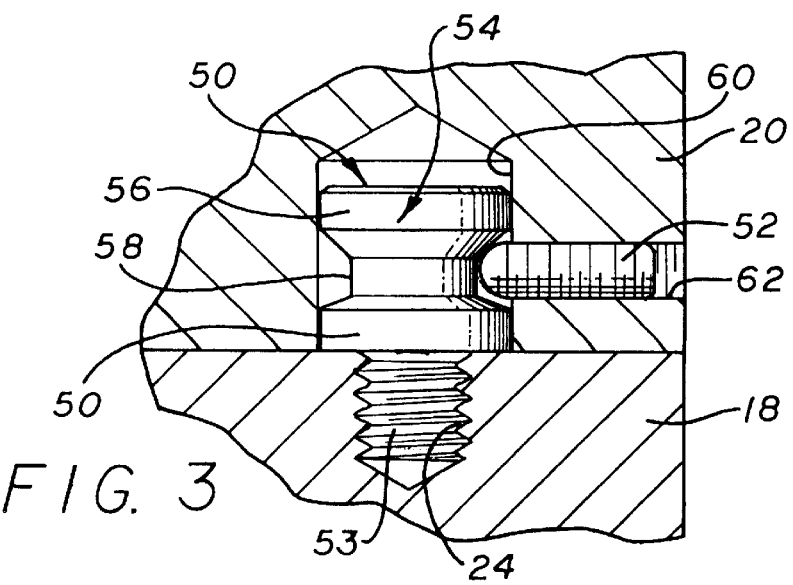
FIG. 3 is a side sectional view showing a set screw that secures a peg to a translation stage of the assembly; and, FIG. 4 is a perspective view of an alternate embodiment of a mount assembly that includes a rotatable disk.

As shown in FIG. 3, the threaded portion 53 of a peg 50 can be screwed into a threaded aperture 24 of a translation table 18. The head portion 54 of the peg 50 may extend into a corresponding aperture 60 in the base 20 of an adjacent translation stage. The fastener 52 can be screwed into a corresponding side threaded aperture 62 of the base 20 and into the groove 58 of the peg 50. One or more pegs 50 and fasteners 52 can be used to attach one translation stage 12, 14 or 16 to another translation stage 12, 14 or 16. The side fasteners 52 are accessible to an operator so that the second stage 14 can be readily attached to the first stage 12. The peg 50 and fastener 52 technique of the present invention is to be distinguished from just using bolts to attach the stages. When using bolts, the table 18 must be moved to access the bolt head. This may be undesirable if an optical element is attached to the translation table.

Referring to FIGS. 1 and 2, the assembly 10 may further include a right angle mounting bracket 64 that can be used to create an xyz-axis stage. The mounting bracket 64 may have a first wall 66 that is essentially perpendicular to a second wall 68. Each wall 66 and 68 may have corresponding apertures 24 and 62 to allow translation stages 12, 14 or 16 to be mounted to the bracket 64 with pegs 50 and fasteners 52 as described above.

The components of the assembly 10 can be sold as a kit that allows an operator to construct an x-axis stage, an xy-axis stage, or an xyz-axis stage. An xy-axis stage can be assembled by initially screwing one or more pegs 50 into the table 20 of the first stage 12. The second stage 14 is then placed over the first stage 12 so that the head portions 54 of the pegs 50 extend into the apertures 60. The fasteners 52 can then be screwed into the grooves 58 to secure the pegs 50 to the second stage 14. An xyz-axis stage can be constructed by attaching the right angle bracket 64 to the table 18 of the second stage 14 and the base 20 of the third stage 16 to the bracket 64. The bracket 64 and third stage 16 can be connected using the pegs 50 and fasteners 52.

Figure 4:
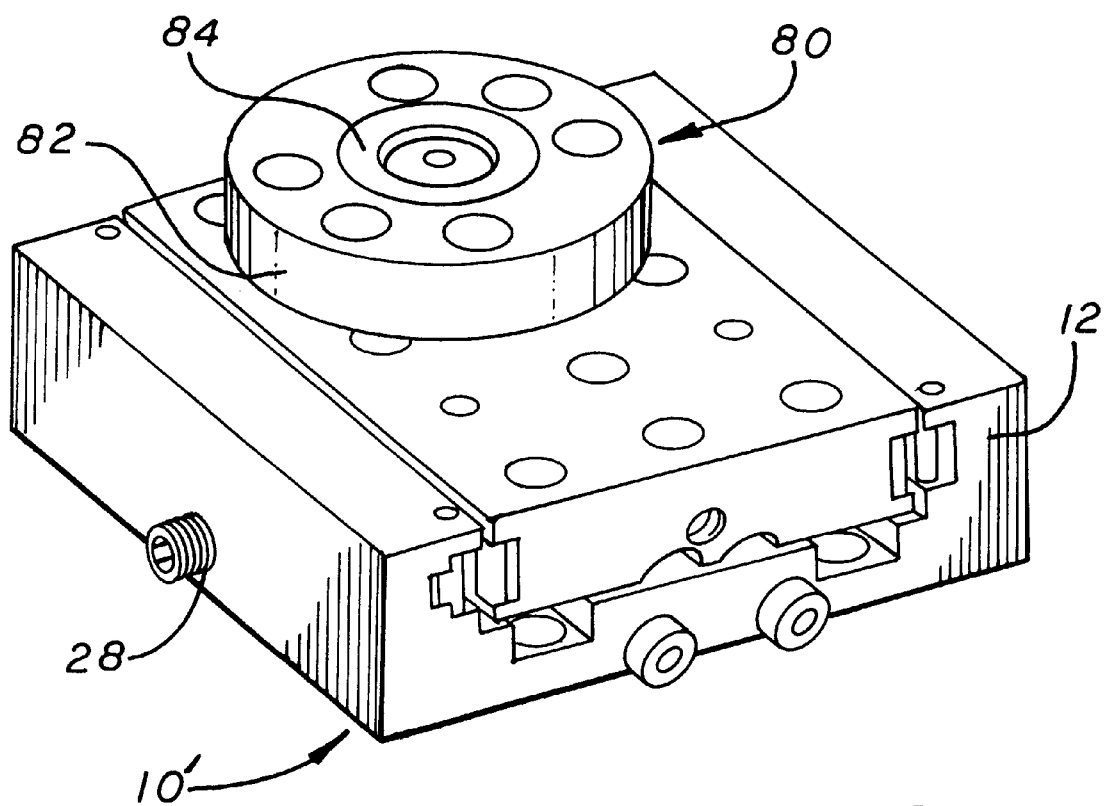

FIG. 4 shows an example of an alternate embodiment of a modular optical mount assembly 10' that has a rotatable disk 80 that is coupled to a first translation stage 12 by one or more pegs (not shown) and fasteners 28. The disk 80 may have an annular pedestal 82 that can rotate about a bearing 84. Although translation stages and a rotatable disk are shown and described, it is to be understood that the pegs and fasteners can be used to connect any optical test bench hardware. For example, cylindrical post and post holders may be used in the modular assembly.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A modular optical mount assembly, comprising:
   a first mount;
   a second mount;
   a first peg that is attached to said second mount and coupled to said first mount; and,
   a fastener that secures said first peg to said second mount.

2. The modular optical mount assembly of claim 1, wherein said first peg includes a threaded portion that extends from a head portion, said head portion includes a groove that receives said fastener.

3. The modular optical mount assembly of claim 2, wherein said head portion includes a pair of collars separated by said groove.

4. The modular optical mount assembly of claim 1, wherein said first mount is a first translation stage.

5. The modular optical mount assembly of claim 4, wherein said first translation stage includes an actuator that is coupled to a translation table, said translation table being coupled to a translation base such that activating said actuator moves said translation table relative to said translation base.

6. The modular optical mount assembly of claim 4, wherein said second mount is a second translation stage.

7. The modular optical translation stage assembly of claim 6, further comprising a third translation stage coupled to said second translation stage.

8. The modular optical translation stage assembly of claim 7, further comprising a bracket that couples said third translation stage to said second translation stage.

9. The modular optical translation stage assembly of claim 1, wherein said second mount is a rotatable disk.

10. A modular optical mount assembly, comprising:
    a first translation stage that includes:
       a first translation base;
       a first translation table that can move relative to said first translation base;
       a first actuator that can move said first translation table;
    a second translation stage that includes:
       a second translation base;
       a second translation table that can move relative to said second translation base;
       a second actuator that can move said second translation table;
    a first peg that is attached to said first translation table and coupled to said second translation base; and,
    a fastener that secures said first peg to said second translation base.

11. The modular optical translation stage assembly of claim 10, wherein said first peg includes a threaded portion that extends from a head portion, said head portion includes a groove.

12. The modular optical translation stage assembly of claim 11, wherein said head portion includes a pair of collars separated by said groove.

13. The modular optical translation stage assembly of claim 10, wherein said fastener is a set screw.

14. The modular optical translation stage assembly of claim 10, further comprising a third translation stage coupled to said second translation stage.

15. The modular optical translation stage assembly of claim 14, further comprising a bracket that couples said third translation stage to said second translation stage.

16. The modular optical translation stage assembly of claim 15, further comprising a second peg that couples said third translation stage to said bracket.

17. A method for assembling a modular optical translation stage assembly, comprising:
    attaching a peg to a first translation stage;
    coupling a second translation stage to the peg; and,
    securing the peg to the second translation stage.

18. The method of claim 16, further comprising the step of coupling a third translation stage to the second translation stage.

19. The method of claim 17, wherein the third translation stage is coupled to the second translation stage by a bracket.

* * * * *